United States Patent [19]
Rice, Jr.

[11] 3,867,049
[45] Feb. 18, 1975

[54] PRESTRESSED SHAFT GRIPPING ELEMENT

[76] Inventor: Delong Rice, Jr., 2140 Victoria Ave., Memphis, Tenn. 38116

[22] Filed: Apr. 16, 1973

[21] Appl. No.: 351,775

[52] U.S. Cl. .................... 403/344, 403/409, 24/21, 24/257 R, 85/8.8
[51] Int. Cl. ............................................. B60b 27/06
[58] Field of Search .......... 403/321, 326, 344, 409; 287/DIG. 4, DIG. 7, DIG. 8; 24/21, 24, 132 R, 256, 257 R; 339/74 R; 85/8.8; 285/308, 321

[56] References Cited
UNITED STATES PATENTS

| | | | |
|---|---|---|---|
| 1,030,073 | 6/1912 | Gibbs | 287/DIG. 8 |
| 1,459,582 | 6/1923 | Dubee | 24/257 R |
| 1,852,919 | 5/1932 | Colas | 151/21 B |
| 2,901,269 | 8/1959 | Rickard | 285/308 |
| 3,071,398 | 1/1963 | Henning | 285/321 |
| 3,473,202 | 10/1969 | Howard | 403/344 |

Primary Examiner—Werner H. Schroeder
Assistant Examiner—Conrad L. Berman
Attorney, Agent, or Firm—John R. Walker, III

[57] ABSTRACT

A self-gripping resilient split-ring collar having a circular hole with a diameter which is normally smaller than the diameter of the shaft over which it is intended to circumferentially extend. The collar includes double camming action structure which coacts with the ends of the collar adjacent the split therein to yieldably urge the ends away from one another to increase the diameter of the circular hole, thus permitting the collar to freely circumferentially engage the shaft whereby it may be moved to and fro along the length of the shaft to the desired location thereon. One embodiment of the camming structure is fixed to the collar and is adapted to receive a hand tool, e.g., a screwdriver or the like, for manipulation thereof. Another embodiment of the camming structure is removable from the collar as a peculiar tool, the tool also being disclosed herein.

11 Claims, 10 Drawing Figures

PATENTED FEB 18 1975 3,867,049
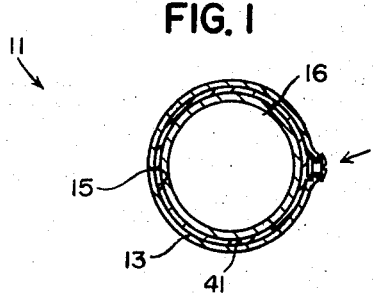
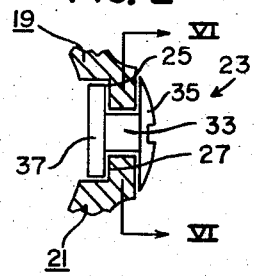
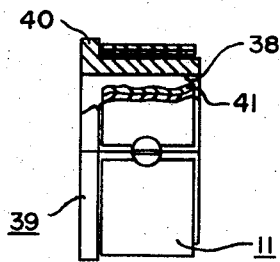
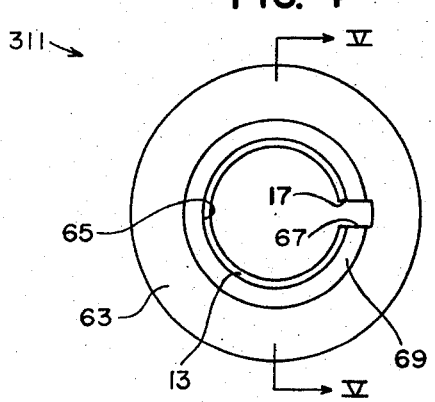
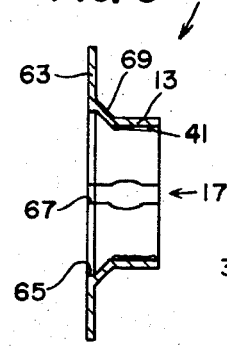
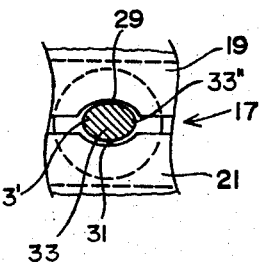
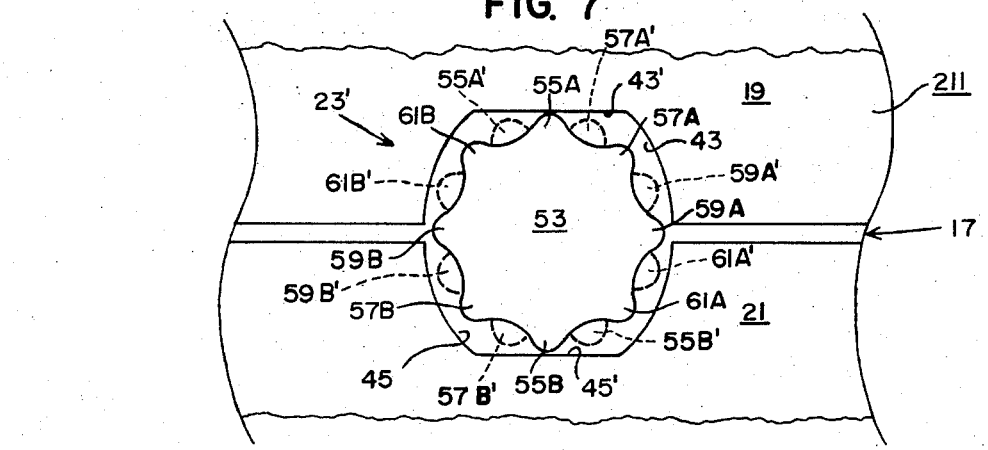
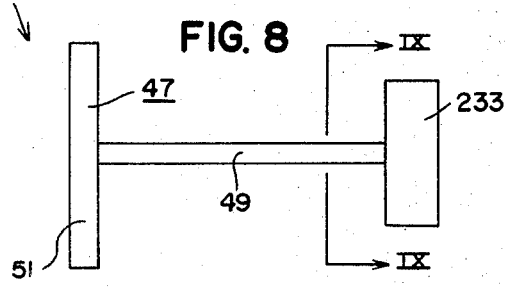
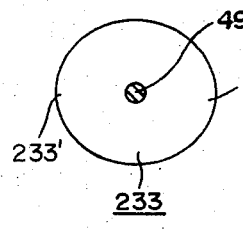
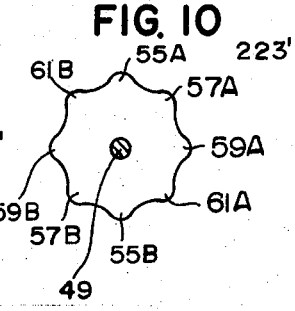

3,867,049

PRESTRESSED SHAFT GRIPPING ELEMENT

BACKGROUND OF THE INVENTION

1. Field of the Invention

This invention relates to the field of prestressed shaft gripping elements.

2. Description of the Prior Art

A preliminary patentability search revealed the following U.S. Patents: the Koen U.S. Pat. Nos. 3,042,433; 3,127,202; and the Howard U.S. Pat. No. 3,473,202. None of the above patents suggest or disclose applicant's invention.

SUMMARY OF THE INVENTION

The concept of the present invention is to provide an improvement in a prestressed shaft gripping element which may alternately be referred to herein as a self-gripping resilient split-ring collar and is of the type disclosed in the above-referenced patents. In other words, the split in the gripping element establishes confrontingly arranged end portions. Additionally, the collar has a circular hole with a diameter which is normally smaller than the diameter of the shaft over which it is intended to circumferentially extend. The gripping element includes double camming action structure which coacts with the confrontingly arranged ends of the gripping element to expand the gripping element or to yieldably urge the ends away from one another to increase the diameter of the circular hole, thus permitting the collar to freely circumferentially engage the shaft whereby it may be moved to and fro along the length of the shaft to the desired location thereon. One embodiment of the camming structure is fixed to the collar and adapted to receive a hand tool, e.g., a screwdriver, end wrench, or the like, for manipulation thereof. Another embodiment of the camming structure is removable from the gripping element as a peculiar hand tool, the tool also being disclosed herein. Another embodiment of the gripping element includes a split collar insert which circumferentially engages the shaft and is interposed between the shaft and the gripping element. Still another embodiment of the gripping element includes a thrust plate for engaging certain structure which may also circumferentially engage the shaft, e.g., a pulley or a bearing assembly or the like. The thrust plate is provided with a circular hole which is larger than the diameter of the shaft and the thrust plate is fixedly attached to the gripping element with the holes in the gripping element and thrust plate being concentric one with the other.

DESCRIPTION OF THE DRAWINGS

FIG. 1 is a sectional view taken along the vertical center line of the prestressed shaft gripping element of the present invention, showing one embodiment of the camming means for expanding the gripping element.

FIG. 2 is an enlarged sectional view more clearly showing the one embodiment of the camming means of the present invention.

FIG. 3 is a side elevational view of the prestressed shaft gripping element of the present invention shown circumferentially engaging a split collar insert; a portion of the gripping element is broken away for clarity and a portion of the collar insert is sectionalized for like reasons.

FIG. 4 is a side elevational view of another embodiment of the prestressed shaft gripping element herein disclosed showing a thrust plate.

FIG. 5 is a sectional view taken as on the line V—V of FIG. 4.

FIG. 6 is a sectional view taken as on the line VI—VI of FIG. 2.

FIG. 7 is an enlarged partial view similar to FIG. 6 but showing another embodiment of the camming means herein disclosed.

FIG. 8 is a side elevational view of the disclosed camming means removable as a tool.

FIG. 9 is a sectional view taken as on the line IX—IX of FIG. 8 showing one embodiment of the working member thereof.

FIG. 10 is a view similar to FIG. 9 but showing another embodiment of the working end of the hand tool depicted in FIG. 8.

DESCRIPTION OF THE PREFERRED EMBODIMENTS

The principal embodiment of the prestressed shaft gripping element 11 of the present invention is clearly shown in FIGS. 1, 2, and 6 of the drawing. The gripping element 11 of the present invention includes an annular strap or ring 13 formed from prestressed steel or the like. In other words, the ring 13 is much thinner than is any of the above-referenced prior shaft engaging units. Each of the above-referenced patents teach a split ring having sufficient thickness to facilitate being provided with a threaded aperture transversely disposed adjacent one of the ends for threadedly receiving spreading screw structure, i.e., the end of the screw engages the broad face of the opposite end of the split ring. It will be appreciated by those skilled in the art that the gripping element 11 herein disclosed could not be adapted to be spread in the manner disclosed by the Koen U.S. Pat. No. 3,042,433 or 3,127,202 or the Howard U.S. Pat. No. 3,473,202 since the thickness of metal from which the ring 13 herein disclosed preferably is 0.015 inches to 0.100 inches.

The gripping element 11 of the present invention has a circular hole 15 with the diameter thereof normally (i.e., when in a relaxed first position prior to being placed over the shaft with which it is intended to be used, e.g., shaft 16) being slightly smaller than the diameter of shaft 16 over which it is intended to circumferentially extend and grip. Additionally, the gripping element 11 is provided with a slit 17 establishing confrontingly arranged end portions 19, 21 thereof.

The gripping element 11 includes the camming means 23 coacting with the end portions 19, 21 for yieldably expanding element 11 into a second position in which the diameter of the circular hole 15 is expanded. Additionally, the camming means 23, by expanding circular hole 15, selectively permits the gripping element 11 to be freely passed circumjacent about the shaft 16 whereby it may be moved to and fro along the length of the shaft while extending circumferentially thereabout and permits the gripping element 11 to assume a more relaxed condition wherein it grips the shaft 16 firmly at the desired location thereon. The camming means 23 is rotatable about an axis which extends radially outwardly from the shaft 16.

More specifically, from FIGS. 1 and 2 of the drawings it may be seen that the confrontingly arranged end portions 19, 21 are offset as at 25, 27 respectively away from the shaft 16 over which it is intended to circumferentially extend. Further, the end portions 19, 21 respectively include confrontingly arranged semi-circular shaped portions 29, 31 for coactive engagement with the camming means in a manner yet to be described.

One embodiment of the camming means 23 includes an out of round shank member 33 having remotely disposed high portions 33', 33'' selectively engaging the semi-circular shaped portions 29, 31 in a manner yet to be fully disclosed. A head member 35 is fixedly attached to one end of the shank member and is suitably adapted to be engaged and rotated by a hand tool, e.g., a screwdriver or the like. Also included is a protuberation 37 fixedly attached to the shank member 33 and is disposed thereon remote from the head member 35 for capturing the shank member 33 between the end portions 19, 21, or more specifically, adjacent the semi-circular shaped portions 29, 31. Rotating the head member 35 is effective to rotatably drive the shank member 33 about its axis to engage the high portions 33', 33'' of the shank member 33 with the semi-circular shaped portions 29, 31 which urges the end portions 19, 21 yieldably away from one another whereby the diameter of the circular hole 15 in the gripping element 11 is increased.

On the other hand, rotating the out of round shank member 33 to the position shown in FIG. 6 of the drawing allows the prestressed gripping element 11 to assume a normal or gripping position. More specifically, the end portions 19, 21 are urged inwardly toward one another and the width of the slit 17 is decreased thus the diameter of the circular hole 15 is decreased and the gripping element 11 is now in a condition to firmly grip the shaft 16.

A split collar insert 39 is disclosed herein and is used in conjunction with the just described gripping element 11. The split collar insert 39 is depicted in FIG. 3 of the drawings which shows the gripping element 11 circumjacent thereto. The split collar insert 39 is preferably formed from a soft metallic substance and is provided with a circular hole, as at 38, so that it might circumferentially engage the shaft 16 to minimize marring the shaft 16. More specifically, the insert 39 is interposed between the shaft 16 and the prestressed gripping element 11 and preferably includes a shoulder member 40 which may engage other structure, e.g., a pulley or the like (not shown), to prevent axial movement thereof.

The gripping element 11 preferably includes a coating substance, e.g., paint, plastic, cadmium plating or the like, which is character referenced herein by the numeral 41. In other words, the coating substance 41 is softer than the gripping element 11 and extends over at least the portion of the gripping element which defines the circular hole 15, thus the coating substance contiguously engages the shaft 16. Accordingly, the coating substance 41 may optionally be desired in lieu of the split collar insert 39 to minimize marring of the shaft 16 and to aid in preventing slippage between the gripping element 11 and the shaft 16. It should be understood that it may be desirable in certain installations to delete the split collar insert 39 and the coating substance 41 without deviating from the spirit and scope of the present invention. Additionally, it may be desirable in certain installations that the coating substance 41 be an electric insulator to prevent conducting electricity between the gripping element 11 and the shaft 16. In this event, the coating substance 41 preferably would be plastic or the like.

An alternate embodiment of the gripping element is herein disclosed and is character referenced by the numeral 211 and the appropriate portions thereof are depicted in FIG. 7 of the drawings. The gripping element 211 includes confrontingly arranged planar cup shaped portions 43, 45 adjacent the respective end portions 19, 21 thereof. The planar cup shaped portions 43, 45 have flat bottom portions 43', 45' for coactive engagement with an alternate embodiment of the camming means herein character referenced by the numeral 23' which will be disclosed later in the specification.

Another embodiment of the camming means of the present invention is herein disclosed and is character referenced by the numeral 223 and is depicted in FIGS. 8 and 9 of the drawing. The camming means 223 is removable as a tool from the gripping element 11 and includes an out of round member 233 having remotely disposed high portions 233', 233'' for engaging the semi-circular portions 29, 31 and handle means 47 for facilitating rotating the member 233 about the axis extending radially from the shaft 16. Engaging the high portions 233', 233'' of the member 233 with the semi-circular portions 29, 31 is effective to expand the gripping element 11 by urging the end portions 19, 21 away from one another as previously described for the shank member 33, i.e., whereby the diameter of the circular hole 15 in the gripping element 11 is increased.

The handle means 47 preferably includes a rod 49 and a T bar member 51. The longitudinal axis of the rod 49 extends radially from the shaft 16 with one end of the rod 49 having fixedly attached thereto the out of round member 233 and the remote end thereof having fixedly attached thereto the T bar member 51. However, it should be understood that the handle means 47 may optionally include other well-known structure for facilitating manipulation thereof, e.g., L shaped structure, etc.

The alternate embodiment of the camming means alluded to above and character referenced by the numeral 23' is shown in FIG. 7 and includes a multiple lobe cam member 53 which is in lieu of the out of round shank member 33 previously described. In other words, the camming means 23' includes the head member 35 fixedly attached to the cam member 53. The head member 35 is adpated to be engaged and rotated by a hand tool, e.g., a screwdriver or the like. The camming means 23' also includes the protuberation 37 previously described or which is fixedly attached to the cam member 53 remote from the head member 35, thus capturing the cam member 53 between the end portions 19, 21. Rotating the head member 35 is effective to rotatably drive the cam member 53 about its axis to engage the cam member 53 with the flat bottom portions 43', 45' which urges the end portions 19, 21 yieldably away from one another whereby the diameter of the circular hole 15 in the gripping element 211 is increased.

More specifically, the multiple lobe cam member 53 includes a plurality of pairs of remotely disposed high portions 55A, 55B; 57A, 57B; 59A, 59B; 61A, 61B as clearly shown in FIG. 7 of the drawings. It should now be apparent to those skilled in the art that rotating the multiple lobe cam member 53 so that the respective high portions 55A, 55B engage the flat portions 43', 45' is effective to increase the diameter of the circular hole 15 in the gripping element 211 or move the end portions 19, 21 away from one another thus increasing the width of the slit 17.

Conversely, rotating the multiple lobe cam member 53 to the position shown in broken lines, or more specifically, rotatably moving the high portions 55A, 55B to the position characterized by the numerals 55A', 55B' allows the gripping element 211 to assume a normal position, i.e., the end portions 19, 21 move toward one another thus the width of the slit 17 is decreased, or the gripping element 211 is now in a position to firmly grip the shaft 16, in the same manner as previously described for the gripping element 11.

The camming means 23' may also be removable as a tool which is character referenced herein by the numeral 223' and depicted in FIG. 10 of the drawing.

The tool 223' is similar to the previously described tool 223, i.e., the only difference being the tool 223' includes a multiple lobe cam member 253 in lieu of the previously described out of round member 233. More specifically, the multiple lobe cam member 253 is substantially identical to the previously described multiple lobe cam member 53 having the plurality of pairs of remotely disposed high portions 55A, 55B; 57A, 57B; 59A, 59B; 61A, 61B.

Particular attention is now directed towards FIGS. 4 and 5 of the drawings wherein it may be seen that another embodiment of the gripping element herein disclosed is depicted and is character referenced therein by the numeral 311. The gripping element 311 includes a thrust plate 63 for engaging certain structure which may also circumferentially engage the shaft 16, e.g., a drive pulley or bearing assembly. In other words, the thrust plate 63 simply prevents axial movement of the drive pulley triggering devices, or the like, since the thickness of the strap or ring 13 being 0.015 inches to 0.100 inches is inadequate for this purpose.

The thrust plate 63 is provided with a circular hole 65 which is larger than the diameter of the shaft 16. The thrust plate 63 is fixedly attached to the strap or ring 13 (or to the principal embodiment of the gripping element 11) with the holes therein, i.e., the circular hole 15 and the circular hole 65, being concentric one with the other substantially as depicted in FIGS. 4 and 5 of the drawings. The thrust plate 63 has a portion thereof notched out as at 67 to allow expansion of the strap or ring portion 13.

The strap or ring portion 13 is fixedly attached about the periphery thereof of the thrust plate 63 by a chamfered member 69 as shown in FIG. 5 of the drawings. It should be understood that the strap or ring member 13 of the gripping element 311 includes end portions (not shown) having semicircular shaped portions 29, 31 respectively or planar cup shaped portions 43, 45 respectively as previously disclosed. Accordingly, rotation of the appropriate camming means (23, 23') about its axis urges the end portions (not shown) yieldably away from one another whereby the diameter of the circular hole 15 in the gripping element 311 is increased. In this regard, it should be understood that the slight increase in diameter of the circular hole 15 necessary to allow the gripping element to be freely placed circumjacent about the shaft 16 is achieved by the flexibility of the chamfered member 69 and the notched out portion of the thrust plate 63 as at 67. It should be understood that the portion of the gripping element 311 defining the circular hole 15 therein may optionally be coated with the previously described substance 41, i.e., the substance 41 is softer than the strap or ring 13 thereof to minimize marring of the shaft 16 and to aid in preventing slippage between the gripping element 311 and the shaft 16.

It will be understood that, if desired, in place of a screwdriver slot in head 35, a socket, not shown, may be provided to receive a hexagon or other shaped tool, as for example, an Allen wrench. Also, it will be understood that instead of the removable tools having a rod 49 with a cam member, such as 53 or 233 on the end of the rod, the tool may be drawn or extruded with the same cross sectional shape throughout. It may be bent 90° to give a lever handle, in much the same manner as an Allen wrench.

Although the invention has been described and illustrated with respect to preferred embodiments thereof, it is to be understood that it is not to be so limited since changes and modifications may be made therein which are within the full intended scope of the invention.

I claim:

1. A gripping element for gripping a shaft, said gripping element formed of resilient sheet metal and being formed into a circular configuration, said element being prestressed into a first position in which the inside diameter of said circle is normally slightly smaller than the diameter of the shaft over which it is intended to circumferentially extend and grip, and said gripping element being provided with a slit establishing confrontingly arranged end portions, camming means coacting with said end portions for yieldably expanding said element into a second position in which the diameter of said circle is expanded to selectively permit said gripping element to be freely passed circumjacent about the shaft whereby it may be moved to and fro along the length of the shaft while extending circumferentially thereabout and for permitting said gripping element a third more relaxed condition than when in said second position wherein said element grips the shaft firmly at the desired location thereon, said camming means being rotatable about an axis which extends radially outwardly from the shaft, and retaining means for holding said camming means against substantial radial outward movement.

2. The improvement of claim 1 including a split collar insert adapted to circumferentially engage and to be interposed between a shaft and said prestressed gripping element.

3. The improvement of claim 2 in which said split collar insert is formed from a soft metallic substance.

4. The improvement of claim 1 in which at least the portion of said prestressed gripping element defining said circle therein is coated with a substance which is softer than said gripping element and adapted to minimize marring of the shaft and to aid in preventing slippage between said gripping element and the shaft over which it is intended to extend.

5. The improvement of claim 4 in which said coating substance is an electric insulator.

6. The improvement of claim 1 in which said confrontingly arranged end portions of said prestressed gripping element are offset away from the shaft over which it is intended to circumferentially extend.

7. The improvement of claim 6 in which said end portions include confrontingly arranged semi-circular shaped portions for coactive engagement with said camming means.

8. The improvement of claim 6 in which said end portions of said gripping element respectively includes semi-circular portions for coactive engagement with said camming means and in which said camming means includes an out-of-round member having remotely disposed high portions engaging said semi-circular portions, said high portions of said out-of-round member being in engagement with said semi-circular portions and expand said gripping element by urging said end portions away from one another whereby the diameter of said circular hole in said gripping element is increased.

9. The improvement of claim 6 in which said end portions of said gripping element include confrontingly arranged planar cup shaped portions having flat bottom portions for coactive engagement with said camming means.

10. The improvement of claim 9 in which said camming means is removable as a tool from said gripping element.

11. The improvement of claim 7 in which said camming means includes an out-of-round shank member having remotely disposed high portions selectively engaging said semicircular portions; and in which said retaining means includes a head member fixedly attached to one end of said shank member and being adapted to be engaged and rotated by a hand tool, and a protuberation fixedly attached to said shank member and being disposed thereon remote from said head member and between said end portions and said shaft, and capturing said shank member between said end portions, said head member being adapted to rotatably drive said shank member about its radially extending axis wherein said high portions of said shank member engages with said semi-circular shaped portions urging said end portions yieldably away from one another whereby the diameter of said circular hole in said gripping element is increased.

* * * * *